[11] 3,575,044

| [72] | Inventors | Harold Gibbs;<br>Walter Jeffrey Lethbridge, Bath, Somerset, England |
|---|---|---|
| [21] | Appl. No. | 689,546 |
| [22] | Filed | Dec. 11, 1967 |
| [45] | Patented | Apr. 13, 1971 |
| [73] | Assignee | National Research Development Corporation<br>London, England |

[54] ULTRASONIC INSPECTION SYSTEM FOR WELDS
8 Claims, 8 Drawing Figs.

[52] U.S. Cl. .................................................. 73/67.9
[51] Int. Cl. .................................................. G01n 29/00
[50] Field of Search ....................................... 73/67.9, 67.8, 67.7

[56] References Cited
UNITED STATES PATENTS

| 2,969,671 | 1/1961 | Sproale .................. | 73/67.9 |
| 3,050,988 | 8/1962 | Gordon et al. ........... | 73/67.9UX |
| 3,321,959 | 5/1967 | Wood et al. ............. | 73/67.7 |

*Primary Examiner*—Jerry W. Myracle
*Attorney*—Cushman, Darby & Cushman

ABSTRACT: The present invention is concerned with an ultrasonic inspection system for welds and the like in which the weld is repeatedly scanned automatically by one or more acoustic transducers each transducer being linked to selected channels of a multi channel high-speed recorder whereby a record showing the position of any flaws together with an indication of their size is produced.

Patented April 13, 1971

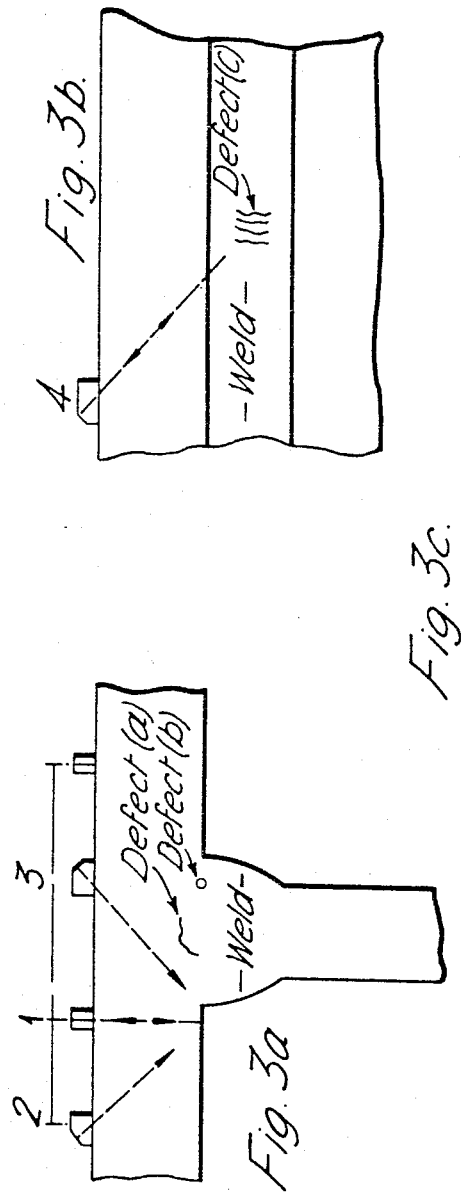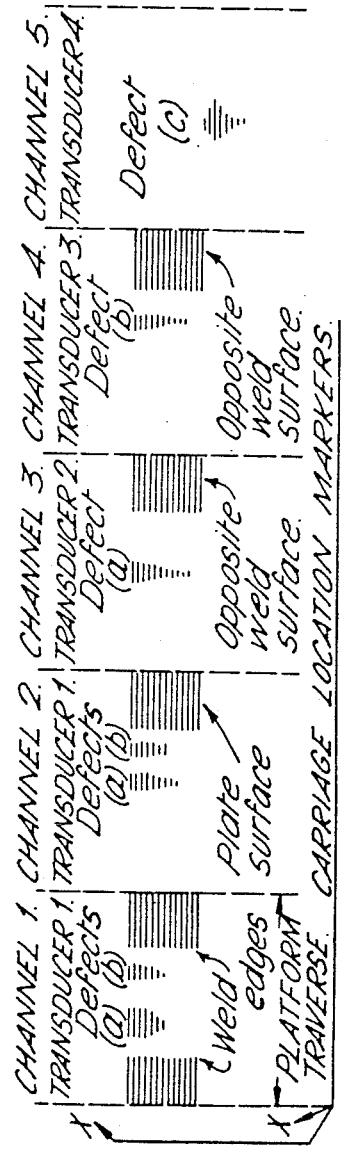

ULTRASONIC INSPECTION SYSTEM FOR WELDS

The present invention is concerned with an ultrasonic inspection system for welds, particularly of butt and fillet welds in large structures such as pressure vessels, irrespective of weld orientation.

Mechanized ultrasonic scanning and recording equipment has been available for several years but application has been mainly limited to butt welds in vessels and components which can be favorably located relative to the ultrasonic scanner. In many cases the components are immersed in a water bath to overcome acoustic coupling difficulties. Few attempts seem to have been made to combine several scans into a comprehensive weld "picture."

The present invention is concerned with an ultrasonic inspection system for welds in which the weld is repeatedly scanned automatically producing a record showing the position and size of any flaws in the weld.

In the present invention the weld is scanned automatically by one or more acoustic transducers each transducer being linked to selected channels of a multichannel high-speed recorder whereby a record showing the position of any flaws together with an indication of their size is produced.

In order that the present invention may be more fully understood, reference will now be made, by way of example, to the accompanying drawings in which:

FIG. 3a is a cross section across a fillet weld showing the disposition of the transducers; and FIG. 3b is a cross section along the line of the fillet weld; and FIG. 3c is an illustration of the traces produced by the recorder the case of fillet weld;

Figure 1:
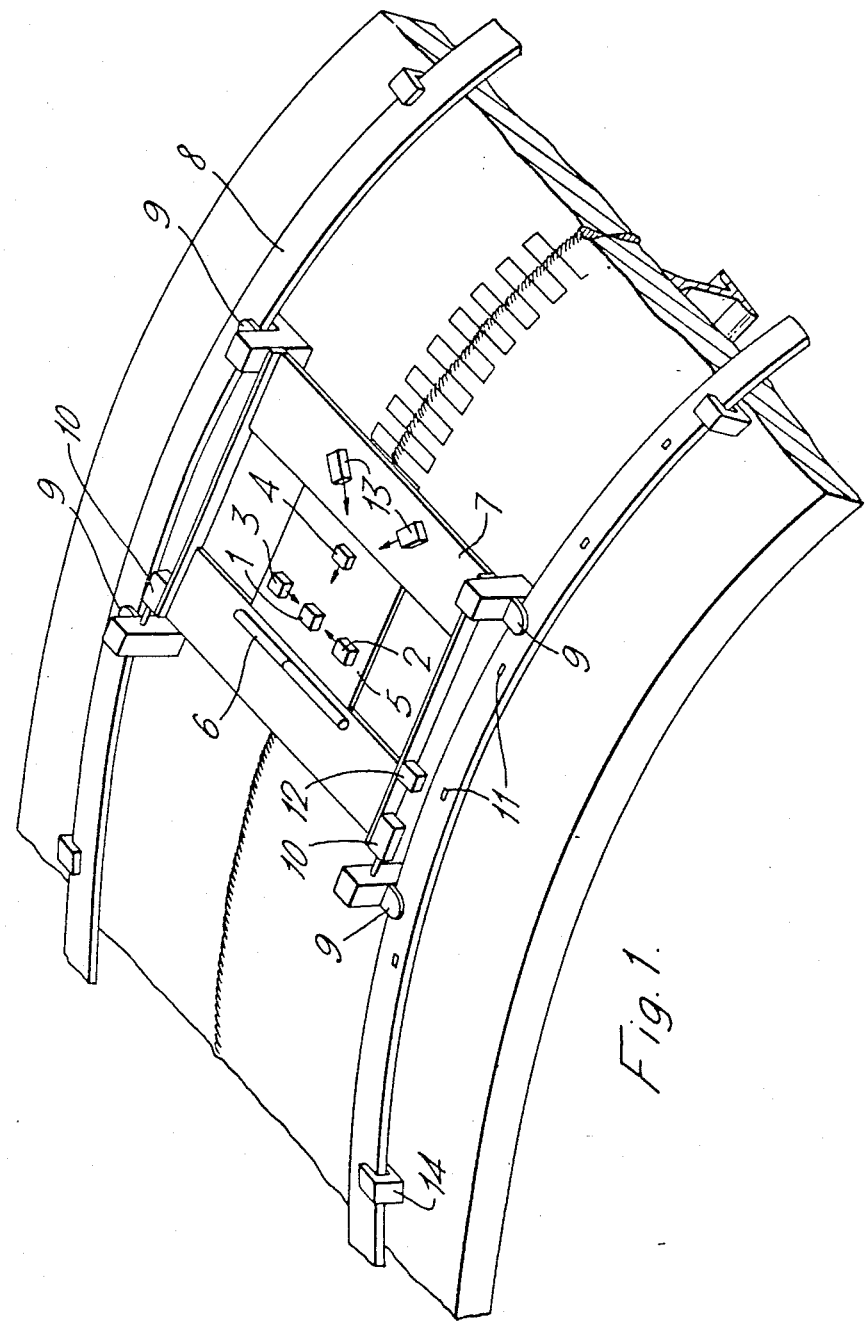
FIG. 1 is a schematic drawing showing the mechanical inspection equipment.

Referring to FIG. 1, acoustic transducers 1, 2, 3 and 4 are float mounted in a common cross slide 5 and located to suit the thickness of the structure and type of weld to be inspected. Transducer 1 transmits and receives compressional waves to plot the weld edges, measure the dimension of the fusion face, show defects in plate and weld metal and to act as a master plan-position indicator in three directions, longitudinal, lateral and depth. Transducers 2 and 3 transmit and receive shear waves at a selected angle with the surface directed inwardly towards each other to detect flaws normal and near normal to the plate surface, and transducer 4 transmits a shear wave at an angle of 45°—70° to the surface along the line of the weld to detect transverse flaws. Alternately switched transmitter pulses are applied to transducers 2 and 3 to minimize unwanted cross-talk when examining butt welds. Some cross-talk is deliberately retained, however, as a check to ensure that both transducers are operating properly and satisfactorily coupled to the work structure.

Transverse movement of the cross slide 5 is produced by pneumatic traversing cylinders 6 linked to the slide, which is carried in guides in the carriage 7. The carriage 7 travels on guide rails 8, to which it may be clamped by clamps 9, one at each corner of the carriage 7, progression the carriage along the rails being effected by operation of pneumatic progression cylinders 10 as will be explained later. Suitable actuators 11 are attached at convenient intervals along one of the rails 8 and these cooperate with a location switch 12 mounted on the carriage to provide a location marker on the recording. Additional acoustic transducers 13 may be carried on the carriage if desired.

Figure 2:
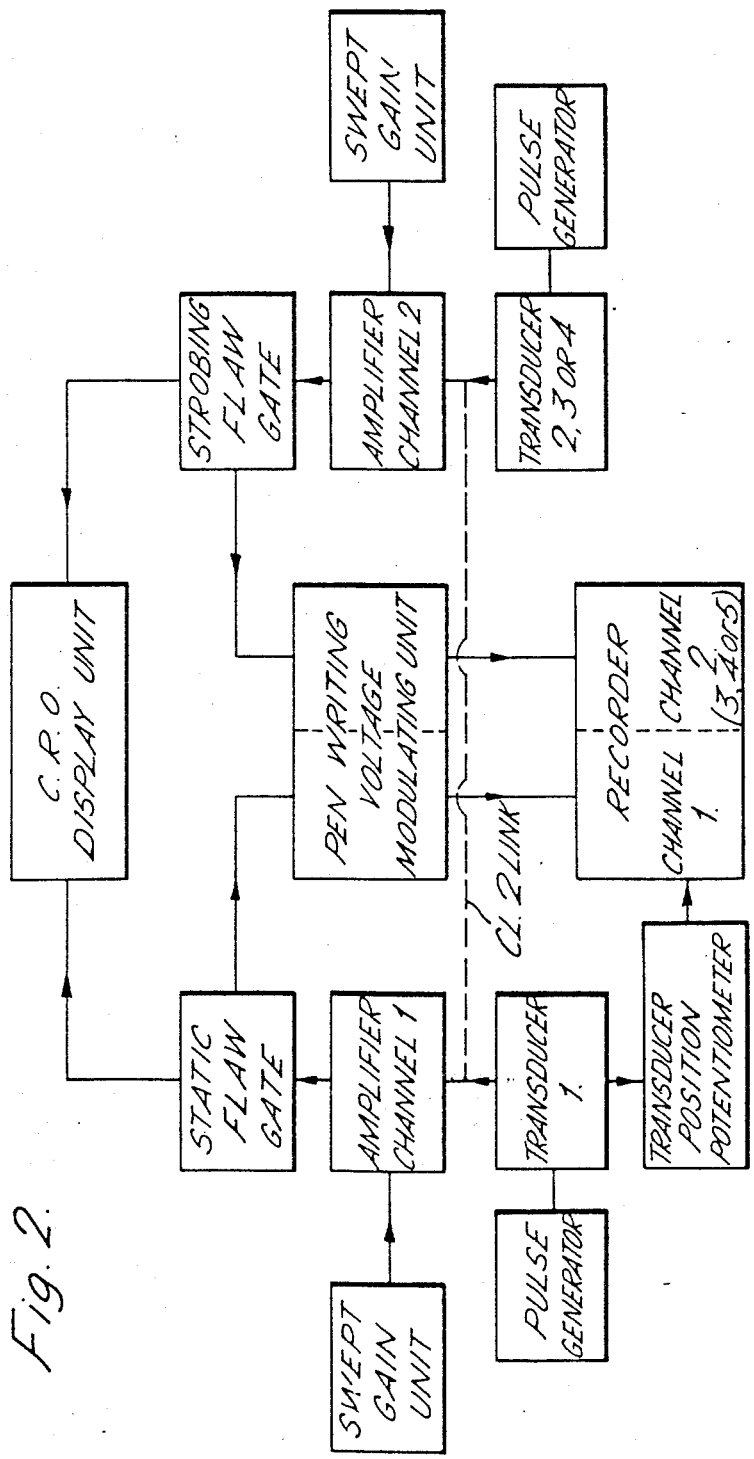
FIG. 2 is a general block schematic of the system showing two channels only.

The guide rails 8 are temporarily attached to the structure parallel with and on either side of the weld to be inspected (For fillet welds the rails are attached to the surface of the passing member opposite the weld). The rails are attached to the structure by rail clamps 14 held by welded studs or by vacuum cups or magnets. Compressed air is used to actuate the carriage and cross slide. Sequencing is arranged through a system of trip, pneumatic and time-delay valves to provide a rectilinear scanning pattern with progression at each end of each transverse of the cross slide. The sequence of operation is as follows: the carriage is firmly clamped to the guide rails by clamping cylinders 9 at each corner of the carriage with the progression cylinders 10 retracted. The transducers are then moved across the weld line by the cross slide at a speed of approximately 5 feet per minute, and, on completion of the transverse, operate trip and pneumatic valves and whereby the forward clamping cylinders release and are then pushed forward by extension of the progression cylinders 10 to operate further trip and pneumatic valves and then clamp the carriage again on the rails. The rear clamping cylinders then release after a delay determined by the time-delay valves and are drawn forward with the carriage by retracting the progression cylinders to again operate further trip and pneumatic valves to cause the rear clamping cylinders to clamp again on the rails. The cross slide then traverses the weld in the opposite direction to complete one cycle (two scans of the weld). Liquid acoustic couplant is applied to the structure between the rails either manually or by irrigation of the carriage or individual transducers. The ultrasonic equipment comprises a console containing four ultrasonic flaw detectors (three if only butt welds are to be inspected) and a five channel high-speed pen recording system (three channels only are required for butt welds). The recorder is also equipped with a location marker which is operated by the location switch 12 on the carriage engaging with the actuators 11 arranged along one of the guide rails. In FIG. 2, which illustrates two channels only, a pulse generator supplies ultrasonic pulses to transducer 1 which transmits and receives compressional waves, the received waves being amplified and passed to the CRO display unit and also to channel 1 of the high-speed pen recorder through a Pen Writing Voltage Modulating Unit. Channel 1 includes a static flow gate which is adjustable for length and position within the overall time base to select any desired area of interest on the time base whereby only signals appearing within the gate are fed to the CRO display unit or the recorder. The Pen Writing Voltage Modulating Unit is to ensure that the pen only writes when there is a signal in the gate. The swept gain unit is a means by which variable transducer characteristics and material attenuation are compensated and the Transducer Position Potentiometer links the physical position of the cross-slide and the recorder to plat the common plan position of defects and weld extremities. The reflected waves received by Transducer 1 passed to Channel 2 by means of a link. Channel 2 includes a strobing flaw gate which scans the time base to determine the position of the reflections along the time base and thus distinguish indications arising from the weld geometry and from internal reflections due to flaws. Transducers 2, 3 and 4 are each connected to channels 3, 4 and 5 respectively, each of which is similar to channel 2 with its own strobing gate and swept gain unit. In the case of channels 3 and 4 alternate switching of transmitter pulses is employed to minimize unwanted crosstalk between transducers 2 and 3, but some cross talk is deliberately returned as a check to ensure that both transducers are operating properly and are satisfactorily coupled to the work structure. Thus channel 1 of the recorder shows the relative plan position of the edges of the weld with respect to the plate or weld flaws as seen by transducer 1 as it traverses the weld. The remaining recorder channels 2, 3, 4 and 5 are recording the position along the CRO time base from which reflections are received. Knowing the ultrasonic beam angle and the sound velocity in the structure this is equivalent to depth measurement, the length of the flaw being indicated by the number of repetitions of the reflection in the scanning pattern. In practice a wide paper high-speed pen recorder is employed simultaneously record up to 5 channels scaled to the movement of the cross-slide (channel 1) and to the time base duration of each transducer (channels 2—5). A transducer position potentiometer links the cross-slide movement to the recorder to plot the common plan position of the weld extremities and the defects. The static flaw gate in the time base of channel 1 is adjustable so that welds of various depths can be investigated and the strobing gates in the time bases of the other channels position in depth the flaw echoes received. The strobing gate system allows flaw position and size to be determined in a single scanning operation and the multichannel recording system provides a complete three dimensional picture of each weld. FIG. 3a is a cross section across a fillet weld showing the disposition of transducers 1, 2 and 3 with respect to the weld, and FIG. 3b is a cross section along the line of the weld showing the disposition of transducer 4 with respect to the weld. FIG. 3c is an illustration of the traces produced by the recorder in the case of a fillet weld. In channel 1 the traces produced by the reflected signals received by transducer 1 as it traverses the weld are shown. The traces on either side of the record are produced by reflections from the weld edges and any intermediate trace is an indication of a flaw either in the metal or in the weld giving rise to a reflection. The plan position of the defect is given in channel 1 but not its depth, for which we have to go to channel 2 which shows the depth of the defects as measured from the plate surface on the right hand side. Channel 3 shows the position of defect a as measured by transducer 2, channel 4 shows the position of defect b as measured by transducer 3, and channel 5 shows the position of defect c along the line of the weld, as measured by transducer 4.

Figure 4B:
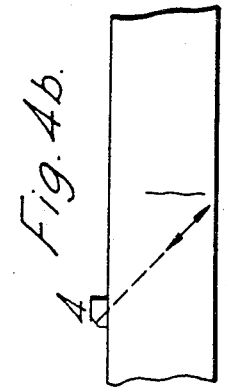
FIG. 4b is a cross section along the line of the butt weld.
Figure 4A:
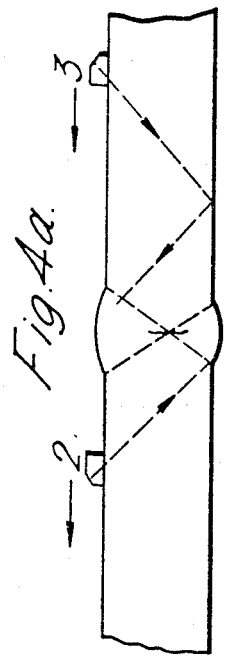
FIG. 4a is a cross section across a butt weld showing the disposition of the transducers.
Figure 4C:
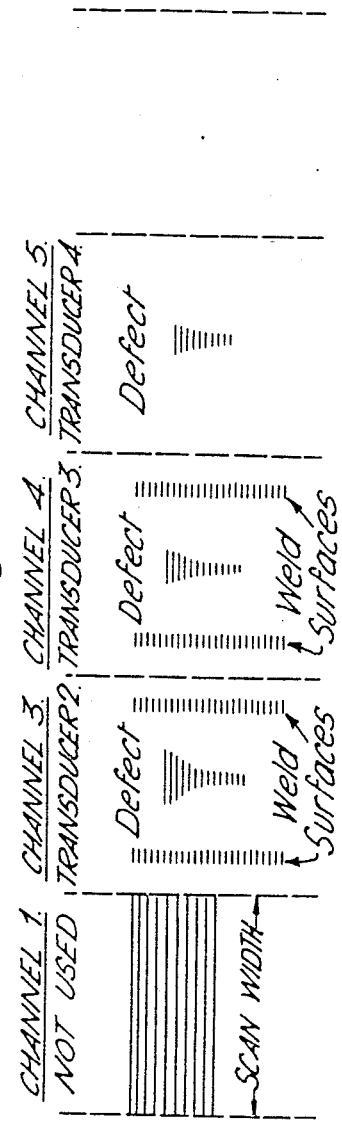
FIG. 4c is an illustration of the traces produced by the recorder in the case of a butt weld.

FIG. 4a is a cross section across a butt weld showing the disposition of transducers 2 and 3 with respect to the weld and FIG. 4b is a cross section along the line of the weld showing the position of transducer 4 with respect to the weld. In the case of butt welds transducer 1 and channels 1 and 2 of the recorder are not used. FIG. 4c is an illustration of the traces produced by the recorder in the case of a butt weld. Channel 3 shows the position of a defect as measured by transducer 2, channel 4 shows the defect as measured by transducer 3, and channel 5 shows the defect as measured by transducer 4.

In practice the transducers are mounted on Perspex blocks to introduce a time delay into the time base to obviate near zone effects that would be produced if the transducer was in contact with the structure. Although transducer 1 is shown and described as a single transducer, in practice a double transducer is used in this position, one transducer transmitting and the other receiving. The advantage of this arrangement is that it improves near surface resolution and also partially obviates erratic near zone effects of the transducers.

Suitable values for the various components employed are a frequency range of 2½ to 5 Mc/s for the transducers with a pulse length of 2 to 3 cycles and P.R.F. approx. 2,000 c.p.s., the maximum time base employed being sufficient to accommodate a delay time in ½ to 1" of Perspex plus the reflection time in steel from 1" to 5" thick at an angle of 45°. The strobing gate should operate at a frequency of 25—50 c.p.s., and the swept gain should be effective over the position and duration of the strobing gate to permit selective control up to 10 decibels maximum in the near zone to zero in the far zone.

Whilst the foregoing description has been in respect of the inspection of welds, it is apparent that the system could in fact be used to inspect for internal flaws in various structures in variety of materials.

We claim:

1. An ultrasonic inspection system for detecting the presence, magnitude and position of flaws in materials, said system comprising:
   a plurality of acoustic transducers in constant relative position with respect to each other;
   said plurality of transducers including at least one transducer disposed for transmitting and receiving shear waves at an angle with respect to a surface of said material;
   automatic traversing means for moving said transducers rectilinearly in longitudinal steps along the length of said material and rectilinearly across said material along a transverse path at the end of each longitudinal step to define a scanning pattern along which ultrasonic pulses are transmitted into said material and reflected pulses are received by said acoustic transducers;
   gating means operatively connected to said transducers for gating said received pulses with respect to time;
   recording means operatively connected to said gating means for recording said received pulses after gating to give an indication of position in magnitude of any flaws in said material, and wherein said automatic traversing means includes;
   a plurality of pneumatic valves operatively connected to said transducers for producing said longitudinal and transverse movements; and
   at least one time delay valve operatively connected to at least some of said pneumatic valves for at least partially controlling the sequence of pneumatic valve operations thereby producing transducer movements along said scanning pattern.

2. An ultrasonic inspection system as in claim 1 wherein said plurality of acoustic transducers includes a transducer disposed to transmit and receive shear waves at a selected angle with respect to a surface of said material along the length thereof to detect flaws extending transversely across the said material.

3. An ultrasonic inspection system for detecting the presence, magnitude and position of flaws in materials, said system comprising:
   a plurality of acoustic transducers in constant relative position with respect to each other;
   said plurality of transducers including at least one transducer disposed for transmitting and receiving shear waves at an angle with respect to a surface of said material;
   said plurality of acoustic transducers including a pair of transducers, each disposed to transmit and receive shear waves at a selected angle with respect to a surface of said material and directed inwardly towards each other to detect flaws extending normal and nearly normal to the surface of said material;
   automatic tranversing means for moving said transducers rectilinearly in longitudinal steps along the length of said material and rectilinearly across said material along a transverse path at the end of each longitudinal step to define a scanning pattern along which ultrasonic pulses are transmitted into said material and reflected pulses are received by said acoustic transducers;
   gating means operatively connected to said transducers for gating said received pulses with respect to time;
   recording means operatively connected to said gating means for recording said received pulses after gating to give an indication of position in magnitude of any flaws in said material; and wherein;
   said automatic tranversing means includes;
   a plurality of pneumatic valves operatively connected to said transducers for producing said longitudinal and transverse movements;
   at least one trip valve operatively connected to at least some of said pneumatic valves for detecting the end of one of said transverse movements; and
   at least one time delay valve operatively connected to at least some of said pneumatic valves for at least partially controlling the sequence of pneumatic valve operations thereby producing transducer movements along said scanning pattern.

4. An ultrasonic inspection system for detecting the presence, magnitude and position of flaws in materials, said system comprising;
   a plurality of acoustic transducers in constant relative position with respect to each other;

said plurality of transducers including at least one transducer disposed for transmitting and receiving shear waves at an angle with respect to a surface of said material;

said plurality of acoustic transducers, including a pair of transducers, each disposed to transmit and receive shear waves at a selected angle with respect to a surface of said material and directed inwardly towards each other to detect flaws extending normal and nearly normal to the surface of said material;

automatic traversing means for moving said transducers rectilinearly in longitudinal steps along the length of said material and rectilinearly across said material along a transverse path at the end of each longitudinal step to define a scanning pattern along which ultrasonic pulses are transmitted into said material and reflected pulses are recieved by said acoustic transducers;

gating means operatively connected to said transducers for gating said received pulses with respect to time;

recording means operatively connected to said gating means for recording said received pulses after gating to give an indication of position in magnitude of any flaws in said material; and means for applying transmitted pulses to each of said pair of transducers alternately to minimize cross talk between said transducers.

5. An ultrasonic inspection system as in claim 4 wherein said automatic traversing means includes:

a plurality of pneumatic valves operatively connected to said transducers for producing said longitudinal and transverse movements;

at least one trip valve operatively connected to at least some of said pneumatic valves for detecting the end of one of said transverse movement; and at least one time delay valve operatively connected to at least some of said pneumatic valves for at least partially controlling the sequence of pneumatic valve operations thereby producing transducer movements along said scanning pattern.

6. An ultrasonic inspection system as in claim 4 wherein said plurality of acoustic transducers includes a transducer disposed to transmit and receive shear waves at a selected angle with the surface of said material along the length thereof to detect flaws extending transversely across said material.

7. An ultransonic inspection system as in claim 6 wherein said automatic traversing means includes:

a plurality of pneumatic valves operatively connected to said transducers for producing said longitudinal and transverse movement;

at least one trip valve operatively connected to at least some of said pneumatic for detecting the end of one of said transverse movements; and at least one time delay valve operatively connected to at least some of said pneumatic valves for at least partially controlling the sequence of pneumatic valve operations thereby producing transducer movements along said scanning pattern.

8. An ultrasonic inspection system for detecting the presence, magnitude and position of flaws in materials, said system comprising:

a plurality of acoustic transducers in constant relative position with respect to each other;

said plurality of transducers including at least one transducer disposed for transmitting and receiving shear waves at an angle with respect to a surface of said material;

said plurality of acoustic transducers, including a pair of transducers, each disposed to transmit and receive shear waves at a selected angle with respect to a surface of said material and directed inwardly towards each other to detect flaws extending normal and nearly normal to the surface of said material;

said plurality of acoustic transducers including a transducer disposed to transmit and receive shear waves at a selected angle with the surface of said material along the length thereof to detect flaws extending transversely across said material;

automatic traversing means for moving said transducers rectilinearly in longitudinal steps along the length of said material and rectilinearly across said material along a transverse path at the end of each longitudinal step to define a scanning pattern along which ultrasonic pulses are transmitted into said material and reflected pulses are received by said acoustic transducers;

gating means operatively connected to said transducers for gating said received pulses with respect to time;

recording means operatively connected to said gating means for recording said received pulses after gating to give an indication of position in magnitude of any flaws in said material.